US012183984B2

(12) United States Patent
Chien et al.

(10) Patent No.: US 12,183,984 B2
(45) Date of Patent: Dec. 31, 2024

(54) ANTENNA APPARATUS AND CONTROL METHOD THEREOF

(71) Applicant: Gemtek Technology Co., Ltd., Hsinchu (TW)

(72) Inventors: Hsiao-Ching Chien, Hsinchu (TW); Fu Ming Yeh, Hsinchu (TW); Hsu-Sheng Wu, Hsinchu (TW); You Chang Shih, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 169 days.

(21) Appl. No.: 18/080,750

(22) Filed: Dec. 14, 2022

(65) Prior Publication Data

US 2023/0352827 A1 Nov. 2, 2023

Related U.S. Application Data

(60) Provisional application No. 63/335,234, filed on Apr. 27, 2022.

(30) Foreign Application Priority Data

Oct. 26, 2022 (TW) ................................ 111140619

(51) Int. Cl.
*H01Q 3/10* (2006.01)
*H01Q 3/24* (2006.01)

(52) U.S. Cl.
CPC ............... *H01Q 3/10* (2013.01); *H01Q 3/242* (2013.01)

(58) Field of Classification Search
CPC ...... H01Q 1/246; H01Q 19/19; H01Q 21/205; H01Q 3/04; H01Q 3/10; H01Q 3/242; H01Q 5/40
See application file for complete search history.

(56) References Cited

U.S. PATENT DOCUMENTS

2008/0248798 A1 10/2008 Chung
2020/0091608 A1 * 3/2020 Alpman .................. H03L 7/145

FOREIGN PATENT DOCUMENTS

TW I288244 10/2007
TW 201101588 1/2011
TW M497351 3/2015

OTHER PUBLICATIONS

"Office Action of Taiwan Counterpart Application", issued on Aug. 16, 2023, p. 1-p. 6.

* cited by examiner

*Primary Examiner* — Monica C King
(74) *Attorney, Agent, or Firm* — JCIPRNET

(57) ABSTRACT

An antenna apparatus and a control method are provided. The antenna apparatus includes a first antenna, a second antenna, and a movable mechanism. The first antenna is operated on a first frequency band. The second antenna surrounds the first antenna and is operated on a second frequency band. The first and second antennas are disposed on the movable mechanism. The movable mechanism is further configured to steer a direction of the first and second antennas. Accordingly, the requirements of multiple frequency bands and beam scanning may be fulfilled.

14 Claims, 8 Drawing Sheets

ANTENNA APPARATUS AND CONTROL METHOD THEREOF

CROSS-REFERENCE TO RELATED APPLICATION

This application claims the priority benefit of U.S. provisional application Ser. No. 63/335,234, filed on Apr. 27, 2022, and Taiwan application serial no. 111140619, filed on Oct. 26, 2022. The entirety of each of the above-mentioned patent applications is hereby incorporated by reference herein and made a part of this specification.

BACKGROUND

Technical Field

The disclosure relates to an antenna technology, and more particularly, to an antenna apparatus and a control method thereof.

Description of Related Art

The fifth generation (5G) new radio (NR) supports frequency bands below 6 GHz and above 50 GHz. Therefore, in recent years, most antennas have designs corresponding to the frequency bands.

SUMMARY

In view of the above, embodiments of the disclosure provide an antenna apparatus and a control method thereof, which may conform to frequency bands supported by 5G NR and provide directivity.

According to an embodiment of the disclosure, an antenna apparatus includes (but is not limited to) a first antenna, a second antenna, and a movable mechanism. The first antenna is operated on a first frequency band. The second antenna surrounds the first antenna and is operated on a second frequency band. The first antenna and the second antenna are disposed on the movable mechanism. The movable mechanism is further configured to steer a direction of the first antenna and the second antenna.

According to an embodiment of the disclosure, a control method includes (but is not limited to) the following. The antenna apparatus is provided. A new orientation of the antenna apparatus is determined according to position information of the antenna apparatus, an orientation of the antenna apparatus, and distances of multiple base stations relative to the position information.

Based on the above, according to the antenna apparatus and the control method thereof in the embodiments of the disclosure, the two antennas supporting different frequency bands respectively are provided, and the directivity of electromagnetic waves may be changed by steering the direction of the two antennas according to requirements. In this way, it may be applied to 5G NR, and beam scanning may be achieved.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
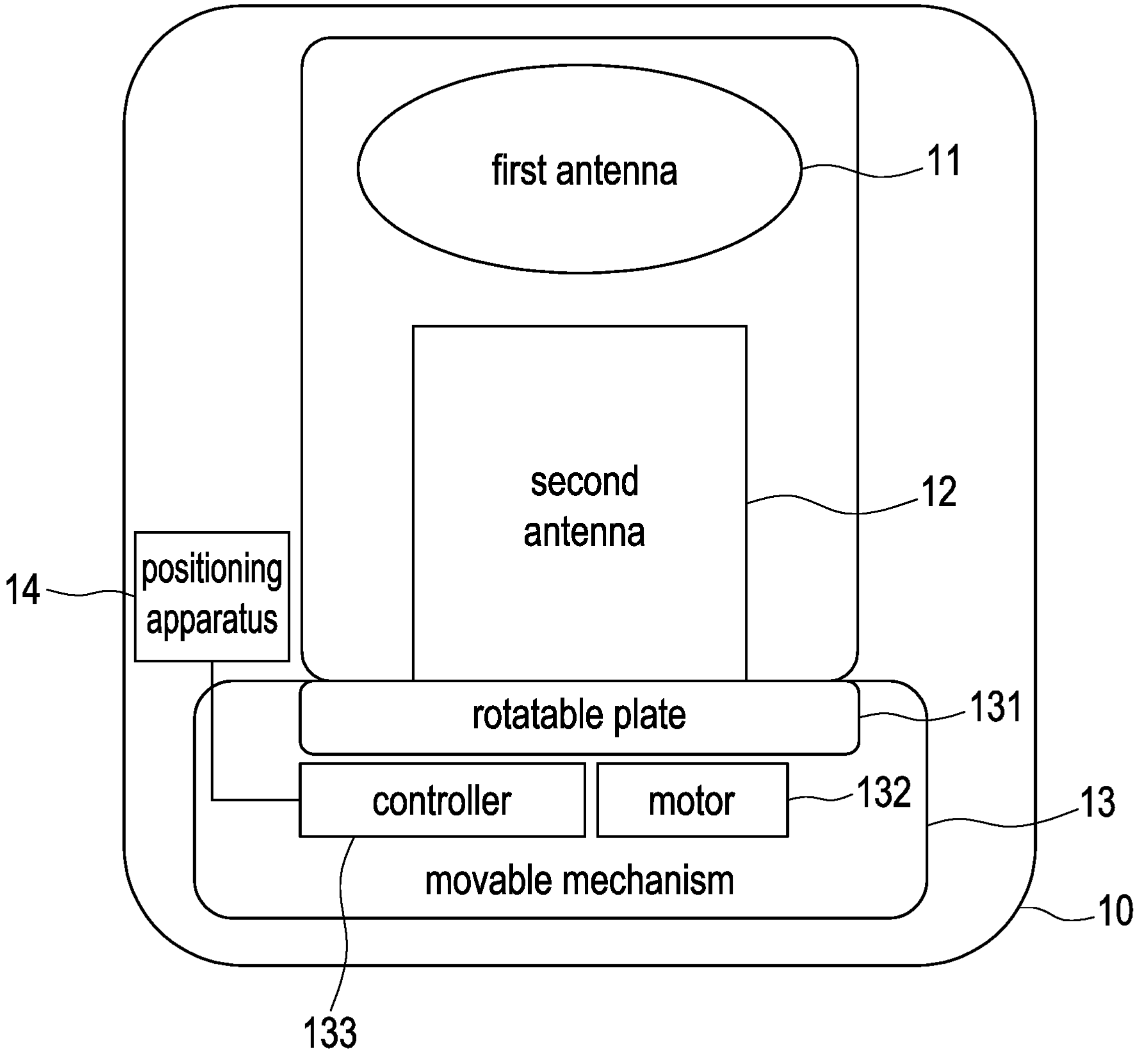
FIG. 1 is a block view of elements of an antenna apparatus according to an embodiment of the disclosure.

FIG. 1 is a block view of elements of an antenna apparatus 10 according to an embodiment of the disclosure. Referring to FIG. 1, the antenna apparatus 10 includes (but is not limited to) a first antenna 11, a second antenna 12, a movable mechanism 13, and a positioning apparatus 14.

The first antenna 11 is operated on a first frequency band. In an embodiment, the first frequency band belongs to a millimeter wave (mmWave) frequency range 2 (FR2), for example, 24.25 GHz to 71 GHz.

Figure 2:
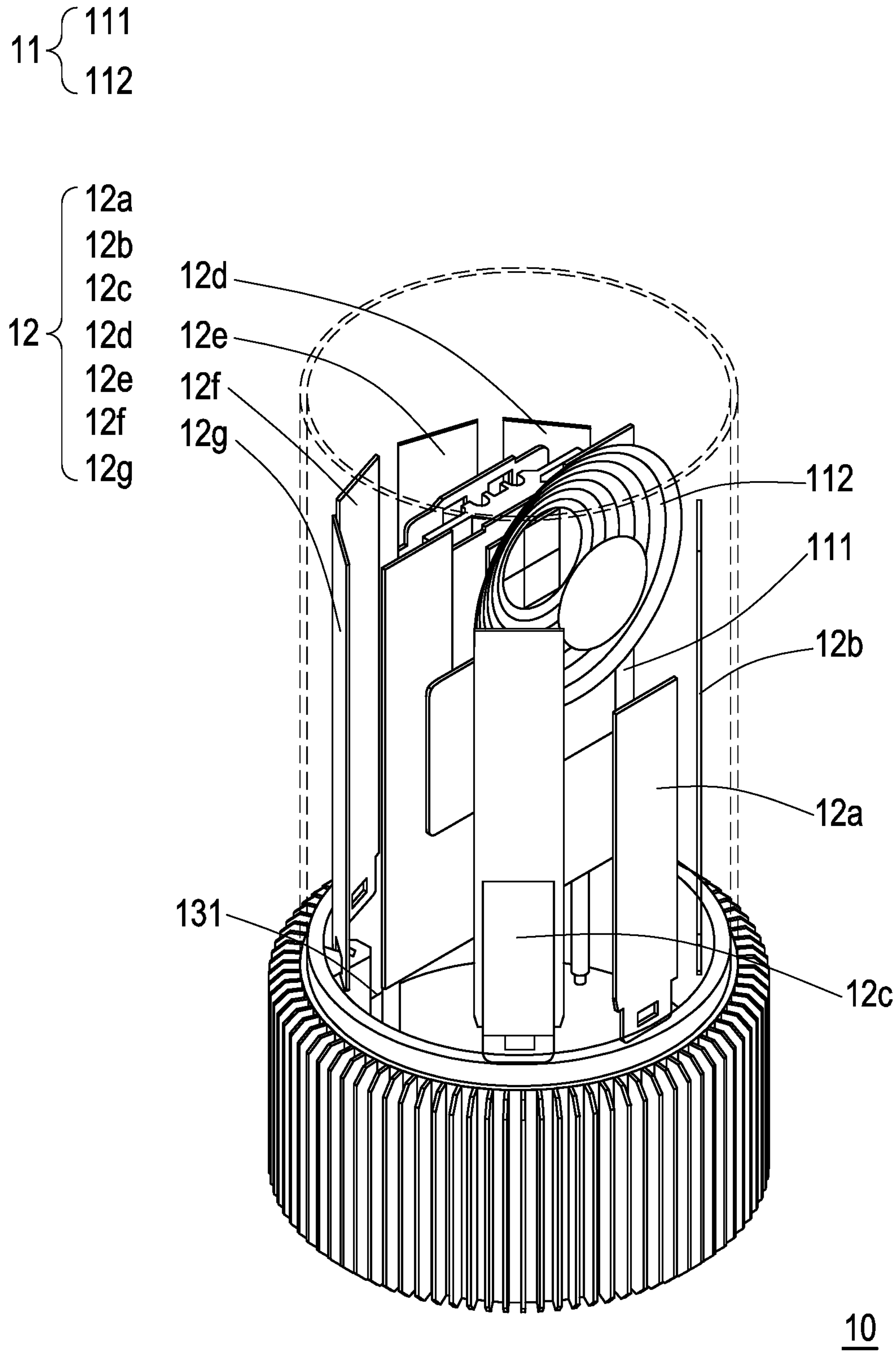
FIG. 2 is a perspective view of an antenna apparatus according to an embodiment of the disclosure.
Figure 3:
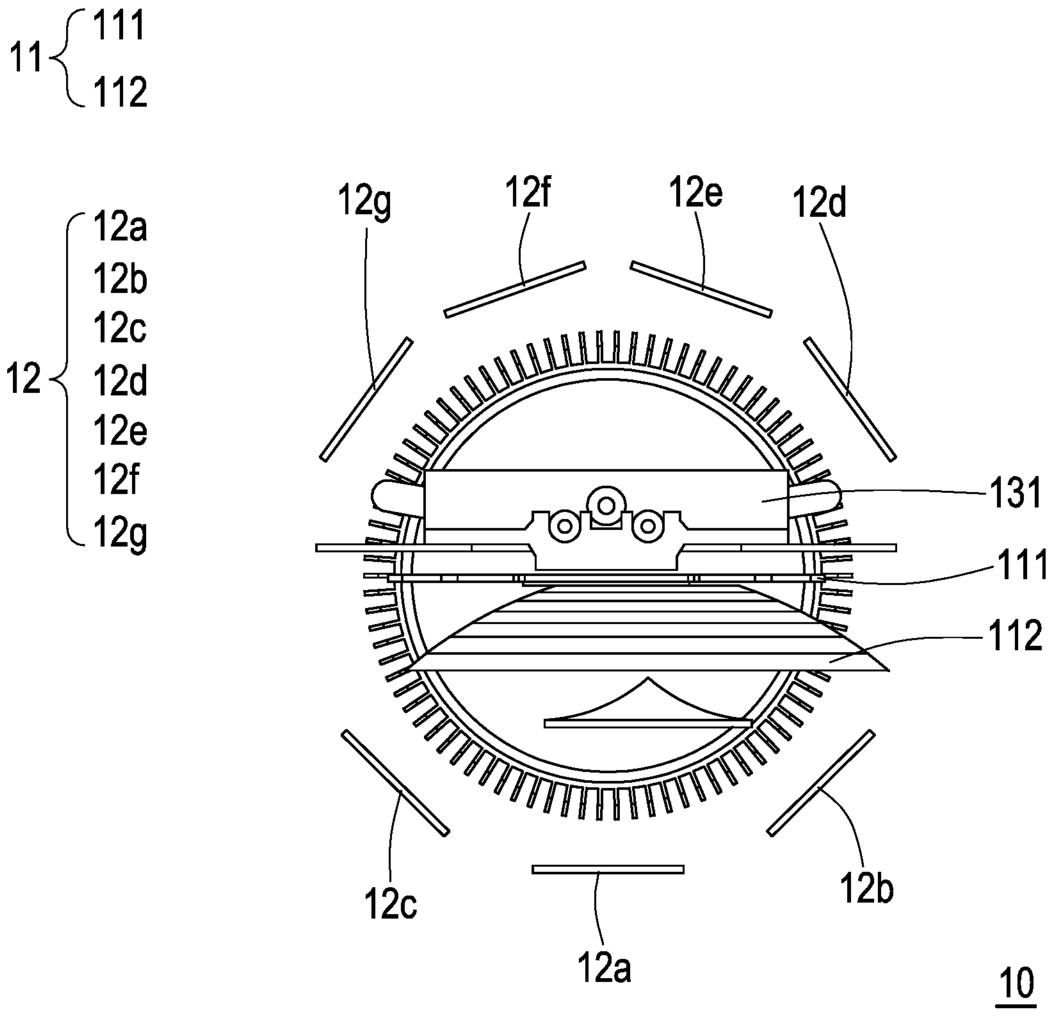
FIG. 3 is a top view of an antenna apparatus according to an embodiment of the disclosure.

FIG. 2 is a perspective view of the antenna apparatus 10 according to an embodiment of the disclosure. FIG. 3 is a top view of the antenna apparatus 10 according to an embodiment of the disclosure. Referring to FIGS. 2 and 3, the first antenna 11 includes a substrate 111 and a dish radiator 112.

The substrate 111 is erected on the movable mechanism 13. That is, a bottom side of the substrate 111 incorporates the movable mechanism 13 and extends upward from the movable mechanism 13 up to a top side of the substrate 111. The substrate 111 may substantially divide a top surface of the movable mechanism 13 into two, but a disposing position is not limited thereto. The substrate 111 may be a rectangle, a geometric shape, or other shapes, and the embodiment of the disclosure is not limited thereto. In an embodiment, the substrate 111 is provided with a transmission line to carry a radio frequency signal.

A bottom side (with a smallest aperture or dish bottom) of the dish radiator 112 is connected to the substrate 111, and a top side (with a largest aperture) faces outward. That is, the aperture of the dish radiator 112 gradually increases from the bottom side, and the aperture of the top side is the largest. The dish radiator 112 helps to enhance signal strength and reduce use of a mmWave radio frequency integrated circuit (IC) to save power. However, characteristics of the dish radiator 112 are not limited thereto.

In an embodiment, the dish radiator 112 includes a feeding portion (not shown and configured to receive the radio frequency signal) connected to the transmission line of the substrate 111, and a radiation portion (not shown) configured to emit electromagnetic waves.

According to different design requirements, in other embodiments, the first frequency band may also be other frequency bands than the FR2, and/or the radiator of the first antenna 11 may be other shapes.

Referring to FIGS. 2 and 3, the second antenna 12 surrounds the first antenna 11. The second antenna 12 includes multiple radiation portions 12*a*, 12*b*, 12*c*, 12*d*, 12*e*, 12*f*, and 12*g*. These radiation portions 12*a* to 12*g* are erected on the movable mechanism 13. As shown in FIG. 2, the radiation portions 12*a* to 12*g* extend upward from the movable mechanism 13. The radiation portions 12*a* to 12*g* may be elongated. The radiation portions 12*a* to 12*g* surround the first antenna 11 and form an annular shape.

The radiation portion 12*a* is located in front of (the front is defined as an extending direction from the bottom side to the top side of the dish radiator 112) the radiator (e.g., the dish radiator 112) of the first antenna 11, and a height of the radiation portion 12*a* is lower than a height of the radiator of the first antenna 11, so that the electromagnetic waves emitted by the first antenna 11 are not blocked or less blocked. Heights of the radiation portions 12*b* to 12*g* are substantially the same as the height of the radiator of the first antenna 11. The radiation portions 12*d* to 12*g* are located behind (the rear is defined as a direction opposite to the extending direction from the bottom side to the top side of the dish radiator 112) the radiator (e.g., the dish radiator 112) of the first antenna 11. However, in other embodiments, the heights of the radiation portions 12*a* to 12*g* may still be adjusted according to requirements.

Furthermore, the second antenna 12 is operated on a second frequency band different from the first frequency band. In an embodiment, the second frequency band belongs to a sub-6 frequency range 1 (FR1), for example, 410 MHz to 7125 MHz.

According to different design requirements, in other embodiments, the second frequency band may also be other frequency bands than the FR1, and/or the radiation portions 12*a* to 12*g* of the second antenna 12 have other shapes or have other numbers or disposing positions. In some embodiments, the antenna apparatus 10 further includes a casing (not shown) to shield the first antenna 11 and the second antenna 12.

Referring to FIGS. 1, 2, and 3, the movable mechanism 13 includes a rotatable plate 131, a motor 132, and a controller 133.

The first antenna 11 and the second antenna 12 are disposed on the rotatable plate 131. The rotatable plate 131 is disc-type, but the rotatable plate 131 may also be changed in shape according to the requirements.

The motor 132 is electrically connected to the rotatable plate 131, and is configured to drive the rotatable plate 131 to rotate. Orientations of the first antenna 11 and the second antenna 12 may be changed by rotating the rotatable plate 131 (hereinafter referred to as an orientation of the antenna apparatus 10 and defined as the extending direction from the bottom side to the top side of the dish radiator 112). Taking FIG. 3 as an example, the orientation of the antenna apparatus 10 is downward in the drawing.

The controller 133 is electrically connected to the motor 132. In an embodiment, the controller 133 determines a new orientation of the antenna apparatus 10 and drives the motor 132 of the movable mechanism 13 according to the new orientation, and the motor 132 may rotate the rotatable plate 131, so that the first antenna 11 and the second antenna 12 of the antenna apparatus 10 are directed to the specified new direction. In an embodiment of the disclosure, the first antenna 11 and the second antenna 12 are disposed on the same rotatable plate 131, so the rotatable plate 131 may drive the first antenna 11 and the second antenna 12 to rotate at the same time. In addition, the height of the radiation portion 12*a* of the second antenna 12 is lower than the height of the radiator of the first antenna 11. In this way, after a direction of the antenna apparatus 10 is steered to the new orientation, the electromagnetic waves emitted by the first antenna 11 may be prevented from being blocked by the second antenna 12.

The controller 133 includes a processor (not shown). The processor may be a central processing unit (CPU), a graphic processing unit (GPU), other programmable general-purpose or special-purpose microprocessors, a digital signal processors (DSP), a programmable controller, a field programmable gate array (FPGA), an application-specific integrated circuit (ASIC), a neural network accelerator, others similar elements, or a combination of the above elements. In one embodiment, the processor is configured to perform all or some of operations of the controller 133, and may load and execute program codes, software modules, files, and data.

Furthermore, in other embodiments, the rotatable plate 131 and the motor 132 may be replaced by a robotic arm or other movable mechanisms.

The positioning apparatus 14 is electrically connected to the controller 133. The positioning apparatus 14 may a receiver that supports a global positioning system (GPS), GLONASS, GALILEO, a BeiDou navigation satellite system, or other satellite positioning systems. In an embodiment, the positioning apparatus 14 is configured to receive a positioning signal and generate position information and/or time information of the antenna apparatus 10 accordingly. The position information may be a latitude and longitude, coordinates in other geographic coordinate systems, or relative positions. In an embodiment, the positioning apparatus 14 includes a compass or an electronic compass, and a magnetic north/south direction of the compass or the electronic compass may be used by the processor of the controller 133 to determine the current orientation of the antenna apparatus 10.

Hereinafter, a method according to the embodiment of the disclosure will be described with reference to each of the elements or modules shown in FIGS. 1 to 3. Each of processes of the method in the embodiment of the disclosure may be adjusted according to situations of implementation, and the disclosure is not limited thereto.

Figure 4:
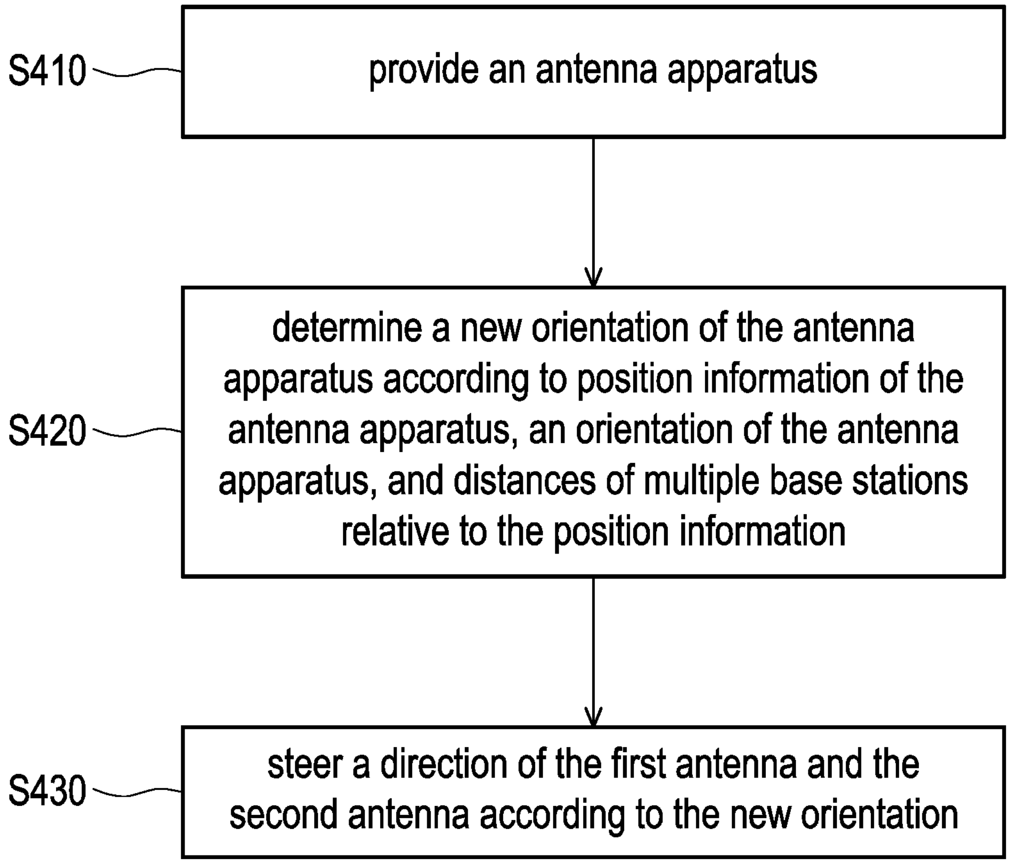
FIG. 4 is a flowchart of a control method of an antenna apparatus according to an embodiment of the disclosure.

FIG. 4 is a flowchart of a control method of the antenna apparatus 10 according to an embodiment of the disclosure. Referring to FIG. 4, the antenna apparatus 10 is provided (step S410). The description of the antenna apparatus 10 may refer to the embodiments of FIGS. 1 to 3. Therefore, the same details will not be repeated in the following.

The processor of the controller 133 may determine the new orientation of the antenna apparatus 10 according to the position information of the antenna apparatus 10, the orientation of the antenna apparatus 10, and distances of multiple base stations relative to the position information of the antenna apparatus 10 (step S420). Specifically, the orientation of the antenna apparatus 10 refers to the current orientation of the antenna apparatus 10, and the new orientation thereof refers to a future orientation of the antenna apparatus 10 or an orientation at a next time point. In addition, the orientation of the antenna apparatus 10 may be defined as a first orientation, and the new orientation may be defined as a second orientation. The controller 133 is about to change the first orientation to the second orientation. The movable mechanism 13 steers a direction of the first antenna 11 and the second antenna 12 according to the new orientation (step S430).

Figure 5A:
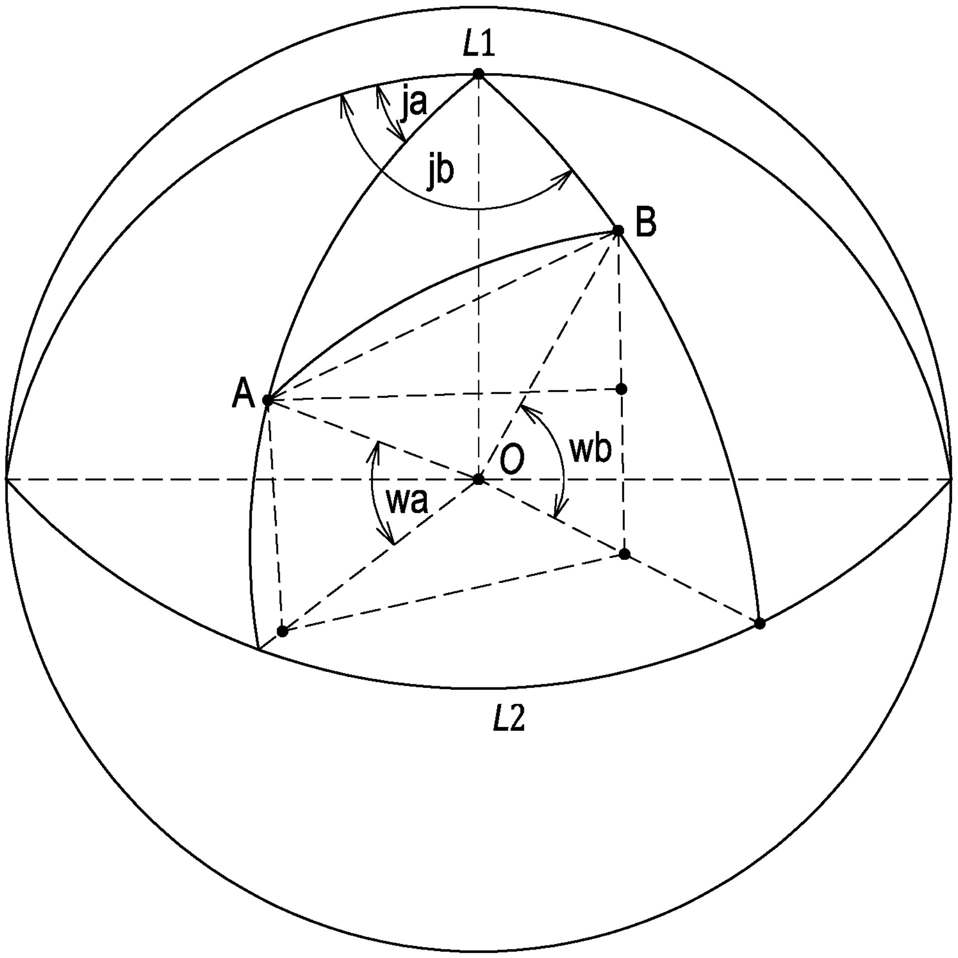
FIG. 5A is a schematic view of determination of a distance according to an embodiment of the disclosure.

FIG. 5A is a schematic view of determination of a distance according to an embodiment of the disclosure. Referring to FIG. 5A, the processor of the controller 133 may calculate a great-circle distance/an orthodromic distance and a bearing angle of relative beginning and ending positions of two places on a spherical surface according to the latitude and longitude of any two places on the earth. The latitude and longitude are auxiliary lines assumed for measurement. A longitude (also referred to as a meridian) L1 is defined as an are line connecting the north and south pole on a surface of the earth. Any two of the longitudes L1 have the same length. The latitude is defined as a trajectory formed by a certain place on the surface of the earth with rotation of the earth. Therefore, any one of the latitudes is parallel to another one of the latitudes. The latitude is longest at an equator L2.

There are many methods to calculate a geospatial distance, for example, an ellipsoid model, a spherical model, or a simplified model. Take the spherical model as an example, it is assumed that a latitude and longitude of a place A on the earth is (ja, wa), and a latitude and longitude of a place B is (jb, wb). A spherical distance (or referred to as an are length) between the places A and B is R* an angle AOB. The angle AOB is a radian of the places A and B. O is a center of the earth. R is a radius of the earth. According to the latitude and longitude and the radius of the earth, the latitudes and longitudes of the places A and B may be converted into spherical coordinates. According to the spherical coordinates of the places A and B, lengths of the places A and B may be obtained, and the angle AOB may be obtained according to a law of cosine. The angle AOB may be used to determine the are lengths of the places A and B, and a mathematical expression thereof is as follows.

$$\hat{AB} = R \text{ arc } \cos(\text{Cos}(wa)\text{Cos}(wb)\text{Cos}(jb-ja)+\text{Sin}(Wa)\text{Sin}(wb)) \quad (1)$$

Figure 5B:
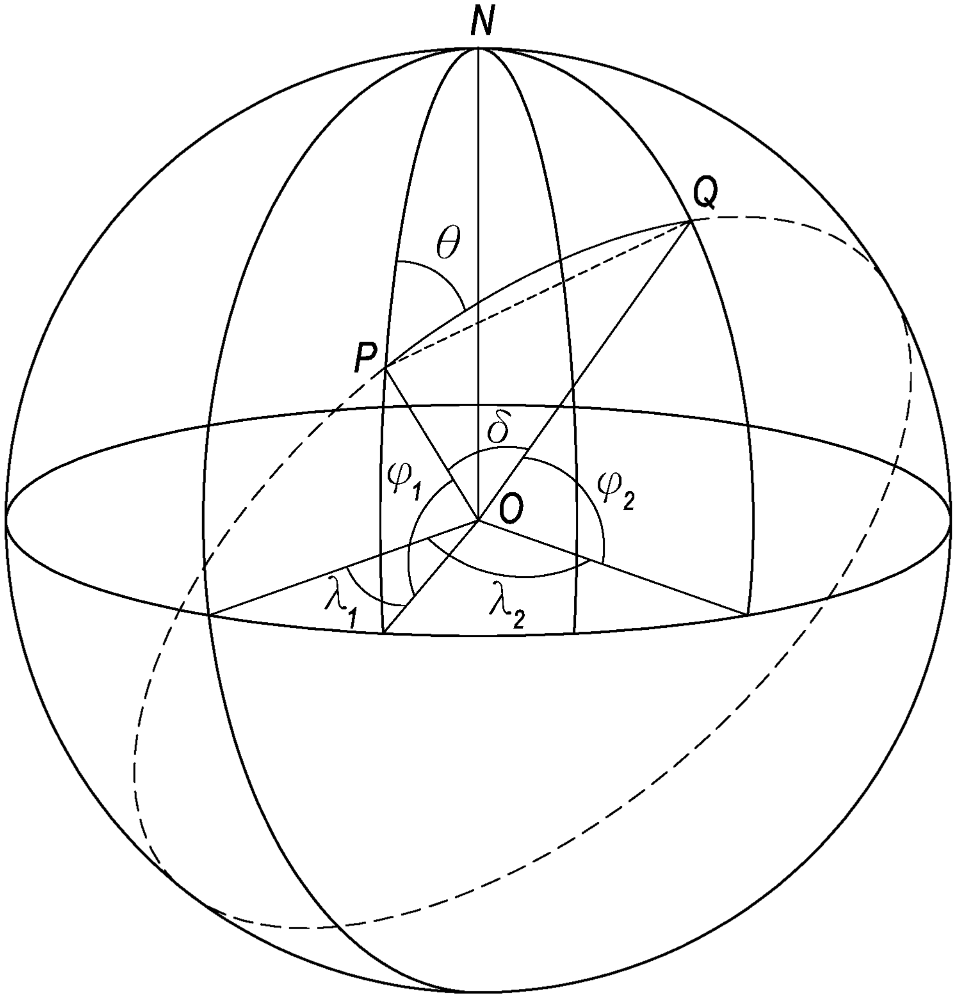
FIG. 5B is a schematic view of determination of a bearing angle according to an embodiment of the disclosure.

FIG. 5B is a schematic view of determination of a bearing angle according to an embodiment of the disclosure. Referring to FIG. 5B, a bearing angle θ is a horizontal included angle between a north longitude of one certain place and a target direction line in a clockwise direction, which is also a size of a dihedral angle formed by an OPN plane and an OPQ plane. Taking a north pole N as a vertex, a trihedral angle is formed by the north pole N and points P, Q, and O. Finally, a mathematical expression of the bearing angle θ is as follows.

$$\theta = \text{atan2}\left(\frac{\sin(\lambda_2 - \lambda_1) * \cos(\varphi_2)}{\cos(\varphi_1) * \sin(\varphi_2) - \sin(\varphi_1) * \cos(\varphi_2) * \cos(\lambda_2 - \lambda_1)}\right) \quad (2)$$

A size of a dihedral angle N-OP-Q is the bearing angle θ, and a plane angle thereof is a difference between π/2 and an angle φ2. A size of a dihedral angle P-ON-Q is a difference between an angle λ2 and an angle λ1, and a plane angle thereof is an angle δ. A sum of the angles φ1, φ2, and δ is π. In an embodiment, the bearing angle may be used as the orientation of the antenna apparatus 10.

In another embodiment, the processor of the controller 133 may determine the current orientation of the antenna apparatus 10 based on the compass or the electronic compass of the positioning apparatus 14.

In addition, the controller 133 further includes a storage unit. The storage unit may be a memory. The storage unit is electrically connected to the processor and may pre-store or download position information (e.g., the latitude and longitude or relative position) of the base station. The processor of the controller 133 may determine a distance between the base station and the antenna apparatus 10 according to the position information of the base station and the position information of the antenna apparatus 10. For example, in the method for calculating the geospatial distance, a distance between two places may be determined based on the longitudes and latitudes of the positions where the antenna apparatus 10 and the base station are located. For another example, the places where the antenna apparatus 10 and the base station are located are mapped to a plane coordinate system, and the distance between the two places is calculated accordingly.

If the antenna apparatus 10 is adjacent to the base stations, the controller 133 may determine a priority order of the antenna apparatus 10 toward the base stations. In an embodiment, the processor of the controller 133 determines the priority order of the antenna apparatus 10 toward the base stations according to the position information of the antenna apparatus 10, the orientation of the antenna apparatus 10, and the distances of the base stations relative to the position information of the antenna apparatus 10. That is, the position information, the current orientation, and the distances are determinants for the priority order. The processor of the controller 133 may determine the new orientation of the antenna apparatus 10 according to the priority orders of the base stations, and steer the direction of the first antenna 11 and the second antenna 12 according to the new orientation. In addition, the higher the priority order of the base station, the antenna apparatus 10 will preferentially face the base station (that is, the new direction is directed to the base station), and signal search is performed accordingly. If it times out, and the signals may not be searched, the processor of the controller 133 may determine that the new orientation is directed to the base station having the next highest priority order. If all the base stations in a list may not establish connections, the antenna apparatus 10 may perform a full scan.

In an embodiment, the processor of the controller 133 may assign a higher priority order to the base stations with shorter distances. That is, the base stations with closer distances have the higher priority order. On the other hand, the processor of the controller 133 may assign a lower priority order to the base stations with longer distances. That is, the base stations with farther distances have the lower priority order.

Figure 6:
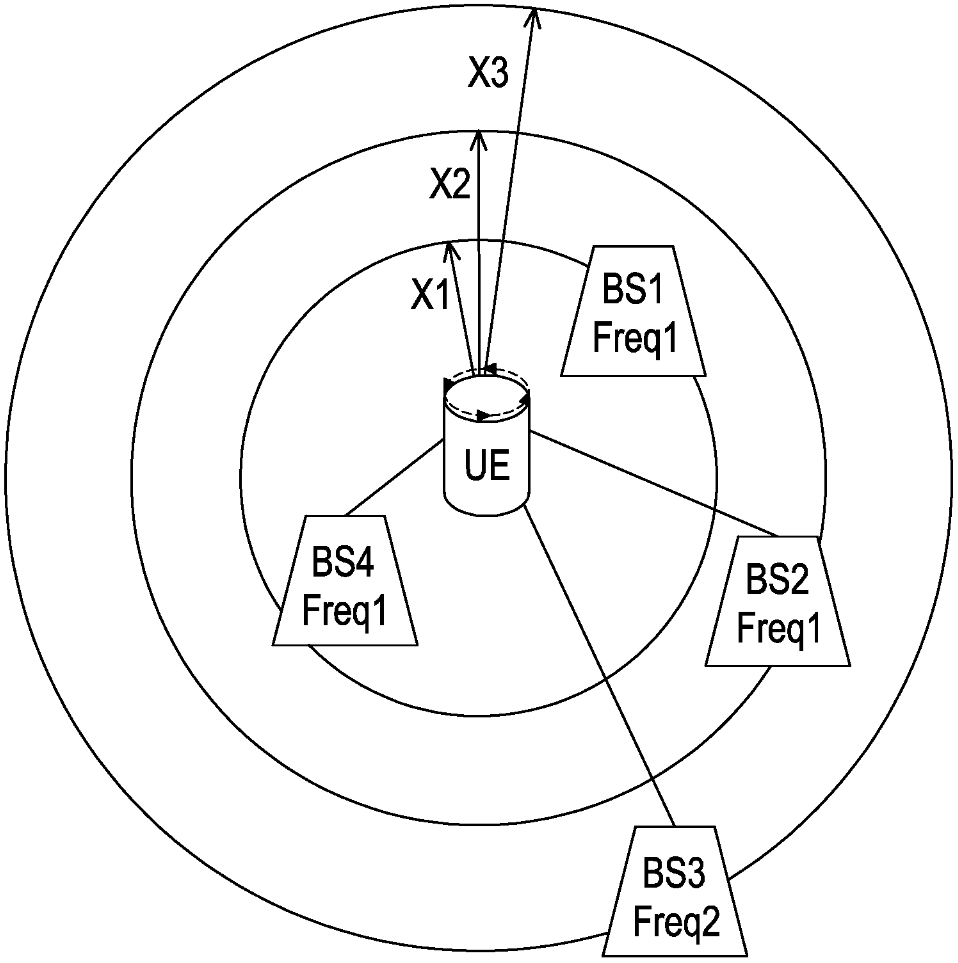
FIG. 6 is a schematic view of selection of a base station according to an embodiment of the disclosure.

For example, FIG. 6 is a schematic view of selection of a base station according to an embodiment of the disclosure. Referring to FIG. 6, a distance between a base station BS4 and a user equipment UE (e.g., a mobile phone, a tablet computer, a notebook computer, a desktop computer, a voice assistant, a smart home appliance, or an in-vehicle system) loaded with the antenna apparatus 10 is less than a distance X1. A base station BS1 is about the distance X1 from the user equipment UE. A base station BS2 is about a distance X2 from the user equipment UE. A base station BS3 is about a distance X3 from the user equipment UE. Therefore, the base station BS4 has the highest priority order. The base station BS1 has the second highest priority order. The base station BS2 has the third priority order. The base station BS3 has the lowest priority order. If the base station may not be connected within a certain period of time, the user equipment UE may select the next farthest base station. When the user equipment UE may not establish the connection with the known base station, the user equipment UE executes a full scan mode.

In an embodiment, the processor of the controller 133 may assign the higher priority order to the base stations with a smaller number of base stations corresponding to the supported frequency bands. That is, frequencies used by the fewer base stations suffer less interference. Therefore, the base stations that support the frequencies used by the fewer base stations have the higher priority order. On the other hand, the processor of the controller 133 may assign the lower priority to the base stations with a larger number of base stations corresponding to the supported frequency bands. That is, the frequencies used by the more base stations suffer more interference. Therefore, the base stations that support the frequencies used by the more base stations have the lower priority order.

Taking FIG. 6 as an example, Table (1) is a corresponding relationship between a base station group and the supported frequencies.

TABLE 1

| Frequency | Base station group |
|---|---|
| Freq1 | BS1, BS2, BS4 |
| Freq2 | BS3 |

The processor of the controller 133 lists the base stations that may be selected within a distance shorter the distance X1. If there is a base station within the distance X1, the new orientation is directed to this base station, and the signals are searched accordingly. If no base station may be selected within the distance X1, the distance is gradually increased (for example, the distances X2 and X3), the new orientation is changed, and the signals are searched accordingly. It is worth noting that if only a single base station may be selected within a certain distance, the new orientation of the antenna apparatus 10 may be directed to this base station. If there are multiple base stations to select from within a certain distance, the processor of the controller 133 may classify the base stations (such as the base station groups shown in Table (1)) according to an emission frequency, and preferentially select the group with the least number of base stations using the frequency. Since interference of a frequency Freq2 is relatively low, the processor of the controller 133 selects the base station with the closest distance in this group and tries connecting. If the base station may not be connected within the certain period of time, the processor of the controller 133 selects the next farthest base station in the same group. If the base stations in this group may not complete the connection with the user equipment UE, the processor of the controller 133 selects other frequencies (e.g., a frequency Freq1) in turn and tries connecting according to the distance. When the user equipment UE may not establish the connection with the known base station, the user equipment UE executes the full scan mode.

In an embodiment, the processor of the controller 133 may assign the higher priority to the base stations with the supported frequency bands belonging to the sub-6 FR1 and mmWave FR2. That is, the base stations that support both the FR1 and FR2 at the same time have the higher priority order. On the other hand, the processor of the controller 133 may assign the lower priority to the base stations with the supported frequency bands belonging to FR1 or FR2. That is, the base stations that support only one of the FR1 or FR2 have the lower priority order.

Figure 7:
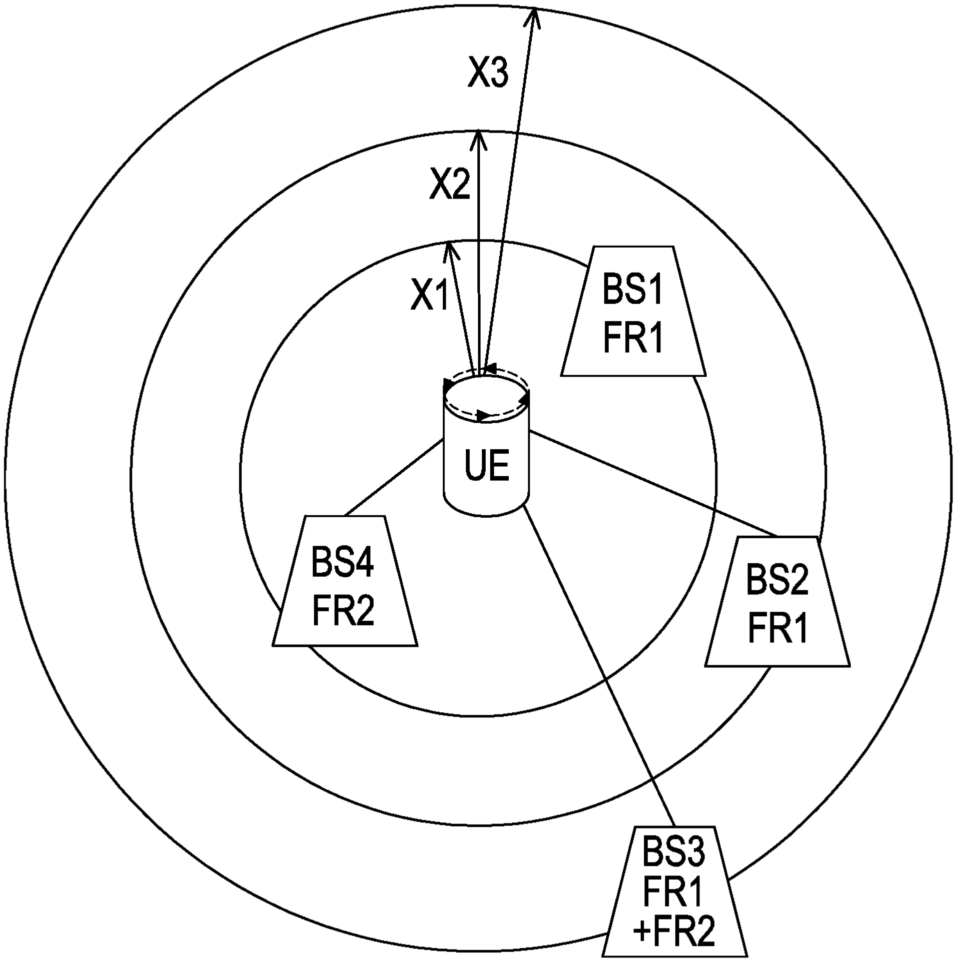
FIG. 7 is a schematic view of selection of a base station according to another embodiment of the disclosure.

For example, FIG. 7 is a schematic view of selection of a base station according to another embodiment of the disclosure. Referring to FIG. 7, the processor of the controller 133 lists the base stations that may be selected within the distance shorter the distance X1. If there is a base station within the distance X1, the new orientation is directed to this base station, and the signals are searched accordingly. If no base station may be selected within the distance X1, the distance is gradually increased (for example, the distances X2 and X3), the new orientation is changed, and the signals are searched accordingly. It is worth noting that if only a single base station may be selected within a certain distance, the new orientation of the antenna apparatus 10 may be directed to this base station. If there are multiple base stations to select from within a certain distance, the processor of the controller 133 may preferentially select the base station that supports both the FR1 and FR2 (e.g., the base station BS3), and then selects the base station that only supports the FR1 or FR2 (e.g., the base stations BS1, BS2, and BS4). If the base station may not be connected within the certain period of time, the processor of the controller 133 selects the base station that supports both the FR1 and FR2 at the same time but is the next most distant. In addition, if the base stations that support both the FR1 and FR2 may not complete the connection with the user equipment UE, the processor of the controller 133 selects the base station that supports only the FR1 or FR2 and tries connecting according to the distance. When the user equipment UE may not establish the connection with the known base station, the user equipment UE executes the full scan mode.

In an embodiment, the priority order of supporting only the FR2 is higher than that of supporting only the FR1. In another embodiment, the priority order of supporting only the FR1 is higher than that of supporting only the FR2. However, in some application scenarios, the priority orders of supporting both the FR1 and FR2, supporting only the FR1, or supporting only the FR2 may still be changed according to the actual requirements. In addition, in some embodiments, the above priority orders based on the distances, the number of base stations supporting the same frequency, and the supporting of the frequency bands at the same time may still be achieved by selecting one, two, or three factors (i.e., the distances, the base stations supporting the same frequency, or the supporting of the frequency bands at the same time) according to the actual requirements, and in a case of selecting the two or three factors, a corresponding weight or priority may still be changed according to the actual requirements. For example, the base station that supports the frequency bands at the same time is preferentially selected, and then the base stations with the closer distances are selected in sequence.

Based on the above, in the antenna apparatus and the control method thereof according to the embodiments of the disclosure, a dual antenna combining different frequency bands (e.g., supporting the FR1 and FR2) is provided. In addition, the directivity of the antenna may be controlled, and the new orientation may be determined according to the priority order. In this way, it may be applied to 5G NR or other generations, and beam scanning may be achieved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An antenna apparatus, comprising:

a first antenna operated on a first frequency band;

a second antenna surrounding the first antenna and operated on a second frequency band; and a movable mechanism, wherein the first antenna and the second antenna are disposed thereon, and the movable mechanism is configured to steer a direction of the first antenna and the second antenna, wherein the second antenna comprises a plurality of radiation portions, the plurality of radiation portions erected on the movable mechanism and surrounding the first antenna.

2. The antenna apparatus according to claim 1, wherein the first antenna comprises:

a substrate erected on the movable mechanism; and a dish radiator disposed on the substrate.

3. The antenna apparatus according to claim 1 or 2, wherein the first frequency band belongs to a millimeter wave (mm Wave) frequency range 2 (FR2).

4. The antenna apparatus according to claim 1, wherein a height of at least one of the radiation portions is lower than a height of a radiator of the first antenna.

5. The antenna apparatus according to claim 1 or 4, wherein the second frequency band belongs to a sub-6 frequency range 1 (FR1).

6. The antenna apparatus according to claim 1, wherein the movable mechanism comprises:

a rotatable plate, wherein the first antenna and the second antenna are disposed thereon; and a motor electrically connected to the rotatable plate and configured to drive the rotatable plate to rotate.

7. The antenna apparatus according to claim 1 or 6, wherein the movable mechanism comprises:

a controller determining a new orientation of the antenna apparatus and driving the movable mechanism according to the new orientation.

8. The antenna apparatus according to claim 7, further comprising:

a positioning apparatus electrically connected to the controller and configured to obtain position information of the antenna apparatus, wherein according to the position information, an orientation of the antenna apparatus, and distances of a plurality of base stations relative to the position information, the controller determines a priority order of the antenna apparatus toward the base stations.

9. The antenna apparatus according to claim 7, wherein according to an orientation of the antenna apparatus and supported frequency bands of a plurality of base stations, the controller determines a priority order of the antenna apparatus toward the base stations.

10. A control method, comprising:

providing the antenna apparatus according to claim 1;

determining a new orientation of the antenna apparatus according to position information of the antenna apparatus, an orientation of the antenna apparatus, and distances of a plurality of base stations relative to the position information;

steering a direction of the first antenna and the second antenna according to the new orientation.

11. The control method according to claim 10, wherein determining the new orientation of the antenna apparatus comprises:

assigning a higher priority order to the base stations with shorter distances; and assigning a lower priority order to the base stations with longer distances.

12. The control method according to claim 10, wherein determining the new orientation of the antenna apparatus comprises:

assigning a higher priority order to the base stations with a smaller number of the base stations corresponding to supported frequency bands; and assigning a lower priority order to the base stations with a larger number of the base stations corresponding to the supported frequency bands.

13. The control method according to claim 10, wherein determining the new orientation of the antenna apparatus comprises:

assigning a highest priority order to the base stations with supported frequency bands belonging to a sub-6 FR1 and a mmWave FR2 of; and assigning a lower priority order to base stations with the supported frequency bands belonging to a FR1 or a FR2.

14. The control method according to claim 11 or 13, wherein determining the new orientation of the antenna apparatus comprises:

determining the new orientation according to the priority orders of the base stations.

* * * * *